US008532022B2

(12) United States Patent
Yagisawa (10) Patent No.: US 8,532,022 B2
(45) Date of Patent: Sep. 10, 2013

(54) WIRELESS STATION AND METHOD FOR CONTROLLING WIRELESS STATION (75) Inventor: Rei Yagisawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1154 days.

(21) Appl. No.: 11/717,148

(22) Filed: Mar. 13, 2007

(65) Prior Publication Data
US 2008/0037462 A1 Feb. 14, 2008

(30) Foreign Application Priority Data
Aug. 14, 2006 (JP) ................................. 2006-221134

(51) Int. Cl.
H04W 4/00 (2009.01)
(52) U.S. Cl.
USPC ........... 370/328; 370/332; 370/338; 370/229; 455/434; 455/403; 455/453; 455/463
(58) Field of Classification Search
USPC .......................................... 370/332; 455/434
See application file for complete search history.

(56) References Cited

U.S. PATENT DOCUMENTS

| | | | | |
|---|---|---|---|---|
| 6,944,463 | B2* | 9/2005 | Gunreben et al. | 455/453 |
| 7,107,344 | B2* | 9/2006 | Davis et al. | 709/227 |
| 7,236,471 | B2* | 6/2007 | Backes et al. | 370/328 |
| 2001/0012778 | A1* | 8/2001 | Eriksson et al. | 455/436 |
| 2002/0004379 | A1* | 1/2002 | Gruhl et al. | 455/403 |
| 2004/0105416 | A1* | 6/2004 | Rue | 370/338 |
| 2006/0040663 | A1 | 2/2006 | Ise et al. | |
| 2006/0142021 | A1* | 6/2006 | Mueckenheim et al. | 455/453 |
| 2007/0064655 | A1* | 3/2007 | Ruuska | 370/332 |

FOREIGN PATENT DOCUMENTS

| | | |
|---|---|---|
| EP | 1 638 256 A1 | 3/2006 |
| JP | 2004-120070 | 4/2004 |
| JP | 2004-221684 | 8/2004 |
| JP | 2004254028 | 9/2004 |
| JP | 2004-320274 | 11/2004 |
| JP | 2005-12724 | 1/2005 |
| JP | 200660322 | 3/2006 |

OTHER PUBLICATIONS

Japanese Office Action dated Feb. 22, 2011 issued in application No. 2006-221134.

* cited by examiner

Primary Examiner — David Q Nguyen
(74) Attorney, Agent, or Firm — Smith, Gambrell & Russell, LLP (57) ABSTRACT A wireless station communicates with a plurality of wireless apparatuses by air and connects to other wireless stations via a network. The wireless station creates a supplementary table in which wireless apparatuses are associated with corresponding wireless stations on the basis of the status of wireless apparatuses that are connecting to the wireless station and the status of wireless apparatuses that are connecting to the other wireless stations. Before a wireless apparatus sends a connection request to the wireless station, the wireless station determines on the basis of predetermined conditions and the supplementary table whether the wireless apparatus can connect to the wireless station.

14 Claims, 8 Drawing Sheets

| Acceptable-connecting-apparatus number | 5 |
|---|---|
| Currently-connecting-apparatus number | 44 |
| Probe-sending-apparatus identification | T01,T02,T03... |
| Connecting-apparatus identification | T01,T02 |

WIRELESS STATION AND METHOD FOR CONTROLLING WIRELESS STATION

BACKGROUND OF THE INVENTION

1. Field of the Invention

The present invention relates to a radio communication system that includes a plurality of wireless stations connected to a network and wireless apparatuses that access the wireless stations, and in particular, relates to a method for establishing communication between a wireless station and a wireless apparatus.

2. Description of the Related Art

In a radio communication system that includes a plurality of wireless stations, a wireless apparatus determines a wireless station to which the wireless apparatus connects. For example, in the Institute of Electrical and Electronics Engineers (IEEE) 802.11, which is a standard of a wireless local area network (LAN), wireless stations periodically send identification information for identifying the wireless stations to the surrounding area, and a wireless apparatus receives the identification information from the wireless stations. Then, the wireless apparatus determines a wireless station to which the wireless apparatus connects on the basis of the identification information. In this way, a connection between a wireless apparatus and a wireless station is established. In the foregoing radio communication system, connections from wireless apparatuses may be concentrated on a certain wireless station. Thus, a problem exists in that the capacity of a wireless station, on which connections from wireless apparatuses are concentrated, to send and receive data to and from wireless apparatuses and a wired network may be overloaded.

In view of this problem, for example, a method is disclosed in Japanese Unexamined Patent Application Publication No. 2004-221684, in which a wireless station sends a wireless apparatus an instruction to connect to another wireless station in the radio communication system upon determining that the wireless station is overloaded.

However, in this method, in a case where communication is performed between wireless stations and wireless apparatuses, even in the overload status, a wireless apparatus needs to receive, from a wireless station to which the wireless apparatus has sent a connection request, a request to connect to another wireless station. Thus, a problem exists in that the number of wireless apparatuses temporarily increases, which require intervention by wireless stations between the wireless apparatuses and a wired network in order to establish connections between wireless stations and wireless apparatuses.

SUMMARY OF THE INVENTION

In view of the foregoing problems, it is an object of the present invention to provide a simplified connection between wireless stations and wireless apparatuses.

A wireless station according to an aspect of the present invention can be connected via a wireless network to a plurality of wireless apparatuses each having identification information and connected via a network to other wireless stations. To solve the foregoing problems, the wireless station includes first storage means for storing a piece of identification information of a first one of the wireless apparatuses that is connecting to the wireless station and a piece of identification information of a second one of the wireless apparatuses that can received by the wireless station, receiving means for receiving pieces of identification information of third ones of the wireless apparatuses that are connecting to the other wireless stations and pieces of identification information of fourth ones of the wireless apparatuses that can received by the other wireless stations, second storage means for storing a piece of identification information of any one of the wireless station and the other wireless stations to which each of the second one of the wireless apparatuses and the fourth ones of the wireless apparatuses can connect on the basis of the pieces of identification information stored in the first storage means and the pieces of identification information received by the receiving means, detecting means for, before one of the wireless apparatuses sends a new request to connect to the wireless station, detecting whether the number of ones of the wireless apparatuses that are connecting to the wireless station exceeds a predetermined number, extracting means for, when the detecting means detects that the number of the ones of the wireless apparatuses, which are connecting to the wireless station, exceeds the predetermined number, extracting a piece of identification information of any one of the other wireless stations to which the one of the wireless apparatuses can connect with reference to the second storage means, and determining means for determining to send no response to the one of the wireless apparatuses when at least one of the other wireless stations to which the one of the wireless apparatuses can connect is available.

In this structure, the wireless station can store pieces of identification information of ones of the other wireless stations that can communicate with the wireless apparatuses in the second storage means in advance. Thus, the wireless station can determine, in advance, to send no response to a specific one of the wireless apparatuses on the basis of the information stored in the second storage means. As the result, even when a specific one of the wireless apparatuses sends a connection request to the wireless station, the wireless station does not need to send a response. Thus, a temporary increase in the number of wireless apparatuses that require intervention of the wireless station can be prevented. Moreover, the wireless station can be prevented from being overloaded.

DESCRIPTION OF THE PREFERRED EMBODIMENT

Figure 1:
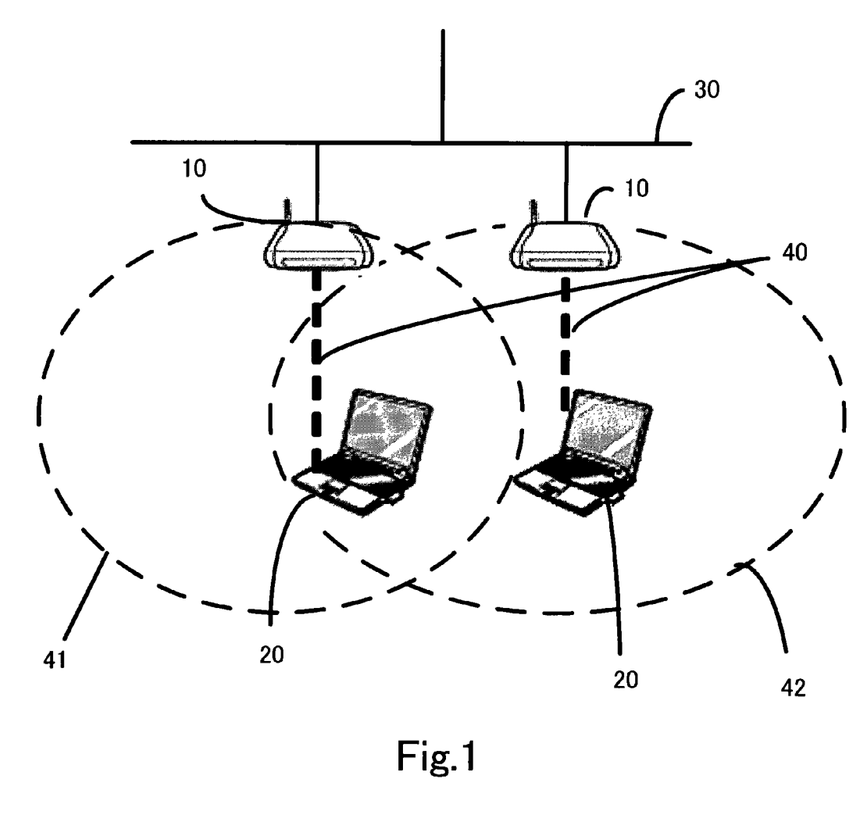
FIG. 1 is a block diagram of a radio communication system according to an embodiment.

An embodiment according to the present invention will now be described with reference to the drawings. FIG. 1 is a block diagram of a radio communication system according to the present embodiment. The radio communication system according to the present embodiment includes wireless stations 10, wireless apparatuses 20, a wired network 30, and wireless networks 40. One (01) of the wireless stations 10 communicates with one (1) of the wireless apparatuses 20 via one of the wireless networks 40. Another one (02) of the wireless stations 10 communicates with the one (1) of the wireless apparatuses 20 and another one (2) of the wireless apparatuses 20 via the wireless networks 40. The one (01) of the wireless stations 10 communicates with the other one (02) of the wireless stations 10 via the wired network 30. The wireless stations 10 are, for example, access points. An access point communicates with ones of the wireless apparatuses 20 via the wireless networks 40 and another access point via the wired network 30. Each of the wireless networks 40 includes one of the wireless stations 10 and ones of the wireless apparatuses 20 based, for example, on standards included in the IEEE 802.11.

The wireless apparatuses 20 are units that are used by users to connect to networks. Networks include, for example, a LAN and the Internet. Each of the wireless apparatuses 20 sends, via one of the wireless networks 40, one of the wireless stations 10 data entered by a user. Then, each of the wireless apparatuses 20 receives data from a communication partner on the wired network 30 via the one of the wireless stations 10 and the one of the wireless networks 40. For example, when one of the wireless apparatuses 20 uses a service on the Internet, the one of the wireless apparatuses 20 accesses a corresponding World-Wide Web (WWW) server via one of the wireless stations 10 and a corresponding Internet service provider (ISP) that provides a connection service to the Internet. The users may carry the wireless apparatuses 20. Thus, the locations of the wireless apparatuses 20 may be changed.

Each of the wireless stations 10 has a range within which communication can be performed using one of the wireless networks 40. A communication range 41 represents a range, indicated by a dotted line, within which the one (01) of the wireless stations 10 can perform communication. A communication range 42 represents a range, indicated by a dotted line, within which the other one (02) of the wireless stations 10 can perform communication. In the case shown in FIG. 1, the one (1) of the wireless apparatuses 20 is covered by the communication range 41 of the one (01) of the wireless stations 10 and the communication range 42 of the other one (02) of the wireless stations 10. Thus, the one (1) of the wireless apparatuses 20 can communicates with the one (01) of the wireless stations 10 and the other one (02) of the wireless stations 10. The other one (2) of the wireless apparatuses 20 is covered by the communication range 42 of the other one (02) of the wireless stations 10. Thus, the other one (2) of the wireless apparatuses 20 can communicate with the other one (02) of the wireless stations 10.

The wired network 30 connects the wireless stations 10 with, for example, a cable. The wireless stations 10 on the wired network 30 communicate with each other according to a communication protocol, for example, Transmission Control Protocol/Internet Protocol (TCP/IP).

Figure 2:
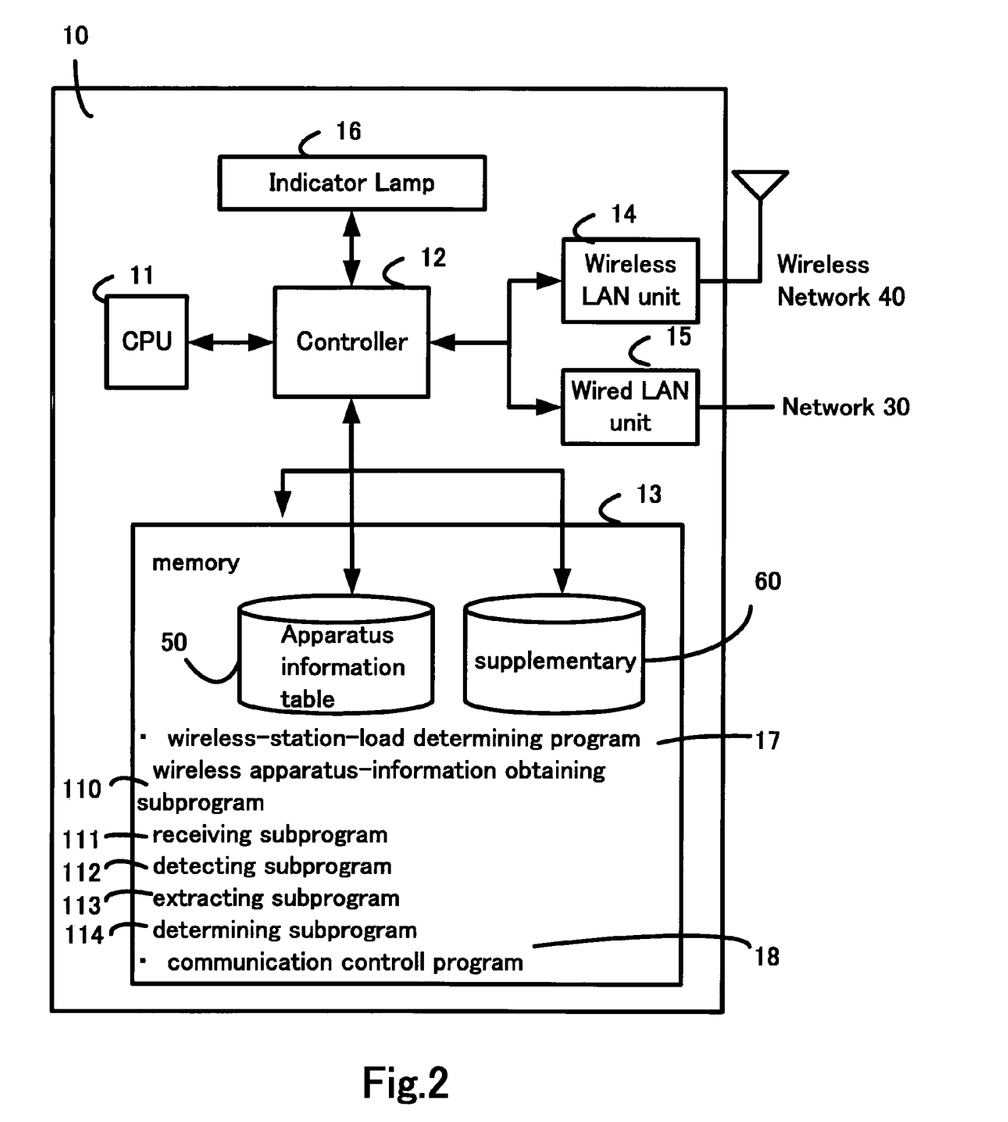
FIG. 2 shows an exemplary hardware configuration of wireless stations.

FIG. 2 shows an exemplary hardware configuration of each of the wireless stations 10. Each of the wireless stations 10 shown in FIG. 2 includes a central processing unit (CPU) 11, a control unit 12, a memory 13, a wireless LAN unit 14, a wired LAN unit 15, and an indicator lamp 16. The CPU 11, the memory 13, the wireless LAN unit 14, the wired LAN unit 15, and the indicator lamp 16 are connected to the control unit 12.

The CPU 11 executes a wireless-station-load determining program 17 and a communication control program 18 stored in the memory 13. When one of the wireless apparatuses 20 sends one of the wireless stations 10 a connection request, the wireless-station-load determining program 17 determines whether to respond to the one of the wireless-apparatuses 20 or not. The CPU 11 functions as a wireless-apparatus-information obtaining unit by executing a wireless-apparatus-information obtaining subprogram 110 included in the wireless-station-load determining program 17. The CPU 11 functions as a receiving unit by executing a receiving subprogram 111 included in the wireless-station-load determining program 17. The CPU 11 functions as a detecting unit by executing a detecting subprogram 112 included in the wireless-station-load determining program 17. The CPU 11 functions as an extracting unit by executing an extracting subprogram 113 included in the wireless-station-load determining program 17. The CPU 11 functions as a determining unit by executing a determining subprogram 114 included in the wireless-station-load determining program 17. The processes performed by the wireless-apparatus-information obtaining unit, the receiving unit, the detecting unit, the extracting unit, and the determining unit are as follows:

The wireless-apparatus-information obtaining unit stores pieces of identification information of first ones of the wireless apparatuses 20 that are connecting to one of the wireless stations 10 and pieces of identification information of second ones of the wireless apparatuses 20 that can be received by the one of the wireless stations 10 in a wireless apparatus information table 50. The wireless-apparatus-information obtaining unit further stores in a supplementary table 60 pieces of identification information of ones of the wireless stations 10, connected to the wired network 30, to which each of the wireless apparatuses 20 can connect, on the basis of the information stored in the wireless apparatus information table 50 and information received via the receiving unit.

The receiving unit receives pieces of identification information of third ones of the wireless apparatuses 20 that are connecting to other ones of the wireless stations 10 and pieces of identification information of fourth ones of the wireless apparatuses 20 that can be received by the other ones of the wireless stations 10. Identification information is information for determining a wireless apparatus, for example, a media access control (MAC) address.

The detecting unit detects, before one of the wireless apparatuses 20 sends a new request to connect to the one of the wireless stations 10, whether the number of ones of the wireless apparatuses 20 that are connecting to the one of the wireless stations 10 exceeds a predetermined number.

The extracting unit extracts from the supplementary table 60 a piece of identification information of any one of the other ones of the wireless stations 10 to which the one of the wireless apparatuses 20 can connect when the detecting unit determines that the number of the ones of the wireless apparatuses 20, which are connecting to the one of the wireless stations 10 exceeds the predetermined number.

The determining unit determines to send no response to the one of the wireless apparatuses 20 when at least one of the other ones of the wireless stations 10 to which the one of the wireless apparatuses 20 can connect is available.

Each of the wireless stations 10 functions as a known wireless station by executing the communication control program 18. The wireless stations 10 communicate with the wireless apparatuses 20 according to the standards included in the IEEE 802.11 by executing the communication control program 18.

The control unit 12 controls distribution of data obtained from each of the CPU 11, the memory 13, the wireless LAN unit 14, the wired LAN unit 15, and the indicator lamp 16. For example, data received from the wireless LAN unit 14 or the wired LAN unit 15 is distributed to the CPU 11 or the memory 13, data obtained from the CPU 11 or the memory 13 is distributed to the wireless LAN unit 14 or the wired LAN unit 15, and the result of executing the wireless-station-load determining program 17 or the communication control program 18 by the CPU 11 is stored in the memory 13.

The memory 13 is storage means, for example, a random access memory (RAM) or a hard disk drive, for storing the wireless-station-load determining program 17, the communication control program 18, the wireless apparatus information table 50, the supplementary table 60, the result of executing the wireless-station-load determining program 17, and the result of executing the communication control program 18. The memory 13 also functions as a work area that is used by the CPU 11 to perform operations.

The wireless LAN unit 14 is an interface for each of the wireless stations 10 to communicate with the wireless apparatuses 20 via the wireless networks 40. This interface is a unit that terminates the wireless protocol (procedure defined in the IEEE 802.11) in the wireless networks 40 between each of the wireless stations 10 and the wireless apparatuses 20. Terminating the wireless protocol in the interface means receiving data based on the wireless protocol from the wireless apparatuses 20 and converting the data to data that can be handled as an IP packet in each of the wireless stations 10.

The wired LAN unit 15 is an interface for each of the wireless stations 10 to communicate with another one of the wireless stations 10 via the wired network 30. Data is exchanged among the wireless stations 10 via the wired network 30, in which a communication protocol is defined. This interface receives data based on the protocol from the wired network 30 and obtains data that can be handled in each of the wireless stations 10 from the received data.

The indicator lamp 16 changes indication depending on predetermined conditions corresponding to the status of each of the wireless stations 10. For example, the indicator lamp 16 changes indication depending on whether each of the wireless stations 10 is communicating with the wireless apparatuses 20 or whether each of the wireless stations 10 is out of order.

Figure 3:
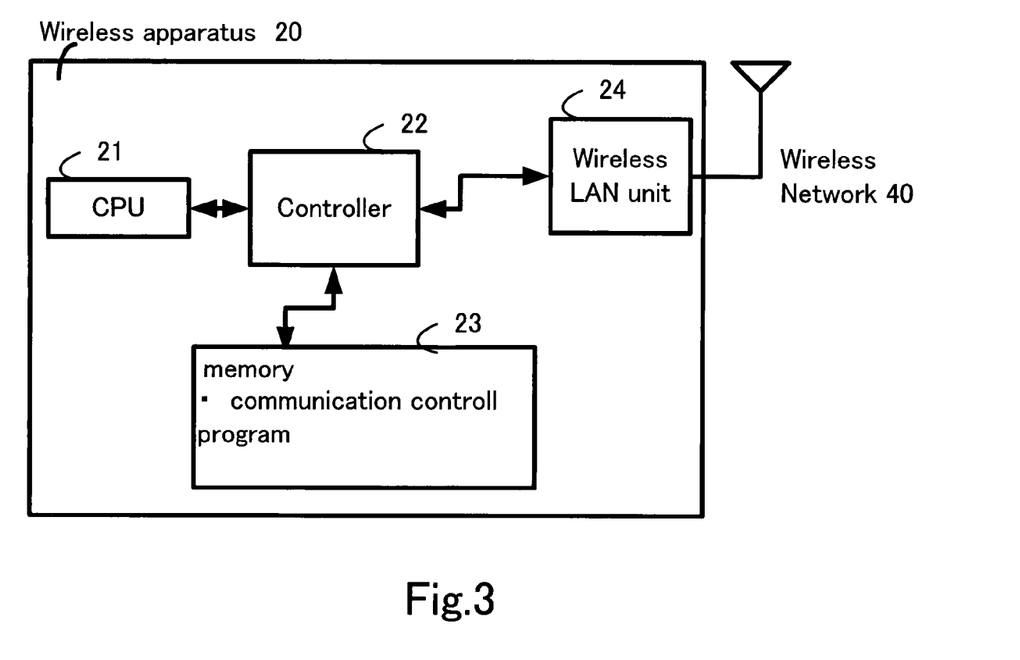
FIG. 3 is an exemplary hardware configuration of wireless apparatuses.

FIG. 3 is an exemplary hardware configuration of each of the wireless apparatuses 20. Each of the wireless apparatuses 20 shown in FIG. 3 includes a CPU 21, a control unit 22, a memory 23, and a wireless LAN unit 24. The CPU 21, the memory 23, and the wireless LAN unit 24 are connected to the control unit 22.

The CPU 21 controls each of the wireless apparatuses 20 according to a known communication control program stored in the memory 23. The CPU 21 communicates with one of the wireless stations 10 according to the standards included in the IEEE 802.11 by executing the communication control program.

The control unit 22 controls distribution of data obtained from each of the CPU 21, the memory 23, and the wireless LAN unit 24. For example, data received from the wireless LAN unit 24 is distributed to the CPU 21 or the memory 23, data obtained from the CPU 21 or the memory 23 is distributed to the wireless LAN unit 24, and the result of executing the communication control program by the CPU 21 is stored in the memory 23.

The memory 23 is, for example, a RAM or a hard disk drive for storing the known communication control program, settings configured in advance, and temporarily created data. The memory 23 also functions as a work area that is used by the CPU 21 to perform operations.

The wireless LAN unit 24 is an interface for connecting the wireless apparatuses 20 to the wireless stations 10 via the wireless networks 40. Data is exchanged between the wireless apparatuses 20 and the wireless stations 10 via the wireless networks 40, in which the wireless protocol is defined. This interface receives data based on the wireless protocol from the wireless networks 40 and obtains data that can be handled in the wireless apparatuses 20 from the received data.

The process of one of the wireless stations 10 communicating with ones of the wireless apparatuses 20 will now be described. The CPU 11 in the one of the wireless stations 10 executes the wireless-station-load determining program 17 stored in the memory 13. The wireless-station-load determining program 17 causes the CPU 11 in the one of the wireless stations 10 to function as the wireless-apparatus-information obtaining unit, the receiving unit, creating means, the detecting unit, and the determining unit.

Figure 4:
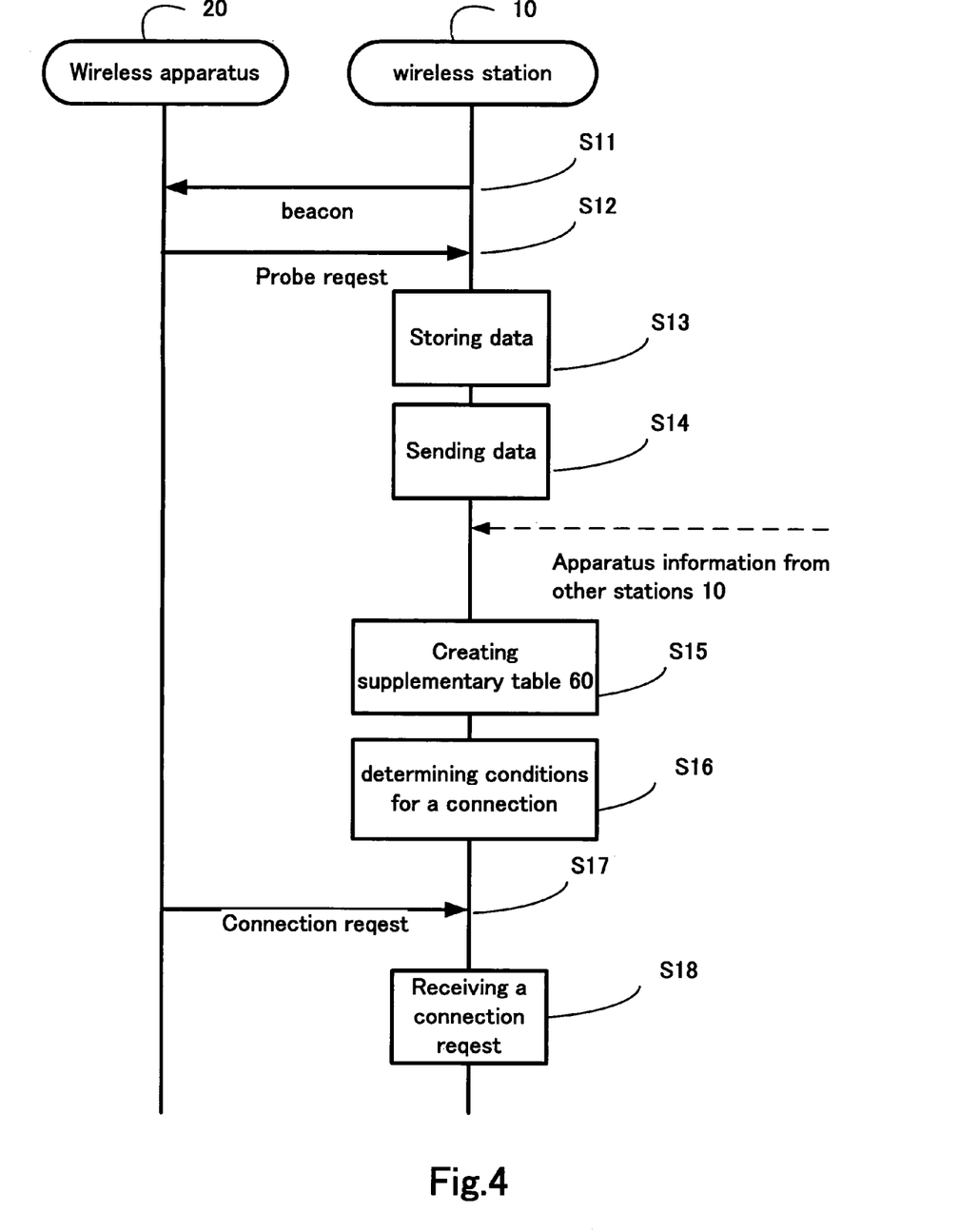
FIG. 4 is a flowchart showing a process performed between the wireless stations and the wireless apparatuses.

FIG. 4 is a flowchart showing a process performed between the one of the wireless stations 10 and the ones of the wireless apparatuses 20.

In step S11, the wireless-apparatus-information obtaining unit in the one of the wireless stations 10 periodically sends a beacon to the surrounding area. A beacon is used to send operational information of a wireless LAN group to which each of the wireless stations 10 belongs. The operational information includes a service set identifier (SSID) for identifying the wireless LAN group, identification information of each of the wireless stations 10, a communication speed, a beacon interval, and the like.

In step S12, each of the ones of the wireless apparatuses 20 sends a probe request before starting communication with the one of the wireless stations 10. A probe request is sent after a piece of identification information for identifying each of the ones of the wireless apparatuses 20 is added to the probe request. A probe request may be sent to the one of the wireless stations 10, which sent the beacon in step S11, or may be sent with no specific destination being specified. The receiving unit receives the probe request from each of the ones of the wireless apparatuses 20.

The wireless-apparatus-information obtaining unit obtains the pieces of identification information of the ones of the wireless apparatuses 20 from the probe requests received from the ones of the wireless apparatuses 20 by the receiving unit in step S12. In step S13, the wireless-apparatus-information obtaining unit stores the obtained pieces of identification information of the ones of the wireless apparatuses 20 in the wireless apparatus information table 50. The wireless apparatus information table 50 is stored in the memory 13.

Figure 5:
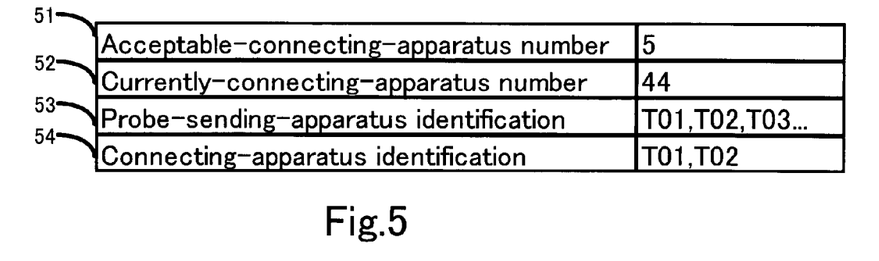
FIG. 5 shows an exemplary structure of a wireless apparatus information table stored in a memory.

FIG. 5 shows an exemplary structure of the wireless apparatus information table 50 stored in the memory 13 in step S13. Each of the wireless stations 10 includes the wireless apparatus information table 50. In the wireless apparatus information table 50, each of the wireless stations 10 manages pieces of identification information of ones of the wireless apparatuses 20 determined by each of the wireless stations 10 and the number of ones of the wireless apparatuses 20. An acceptable-connecting-wireless-apparatus number 51, a currently-connecting-wireless-apparatus number 52, probe-sending-wireless-apparatus identification information 53, and connecting-wireless-apparatus identification information 54 that are items of the wireless apparatus information table 50 will now be described as follows:

The acceptable-connecting-wireless-apparatus number 51 represents the predetermined maximum number of ones of the wireless apparatuses 20 that are allowed to communicate with each of the wireless stations 10 for data exchange. For example, the acceptable-connecting-wireless-apparatus number 51 is determined so that a predetermined speed of communication between each of the wireless stations 10 and ones of the wireless apparatuses 20 (i.e., the quality of service) can be maintained.

The currently-connecting-wireless-apparatus number 52 represents the number of ones of the wireless apparatuses 20 that are currently communicating with each of the wireless stations 10.

The probe-sending-wireless-apparatus identification information 53 represents pieces of identification information of ones of the wireless apparatuses 20, each of the wireless stations 10 having received probe requests from the ones of the wireless apparatuses 20, having obtained the pieces of identification information of the ones of the wireless apparatuses 20, and not being communicating with the ones of the wireless apparatuses 20 for data exchange.

The connecting-wireless-apparatus identification information 54 represents pieces of identification information of ones of the wireless apparatuses 20 that are currently communicating with each of the wireless stations 10.

After step S13, in step S14, the one of the wireless stations 10 sends the wireless apparatus information table 50 updated with new information in step S13 to other ones of the wireless stations 10 via the wired network 30.

Figure 7:
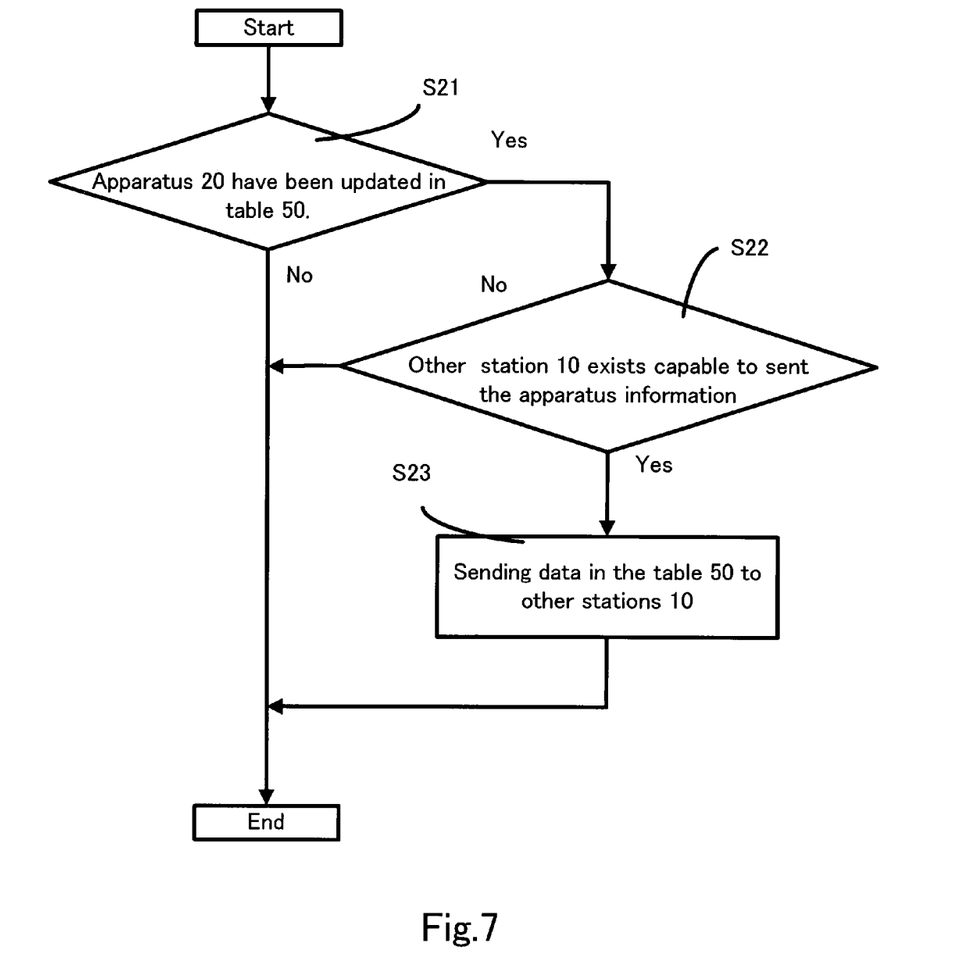
FIG. 7 is a flowchart showing the details of a process of one of the wireless stations sending the wireless apparatus information table to other ones of the wireless stations.

FIG. 7 is a flowchart showing the details of the process of the one of the wireless stations 10 sending the wireless apparatus information table 50 to other ones of the wireless stations 10 in step S14.

In step S21, the wireless-apparatus-information obtaining unit determines whether pieces of information, in the wireless apparatus information table 50, related to the ones of the wireless apparatuses 20 have been updated, the one of the wireless stations 10 having received the pieces of identification information of the ones of the wireless apparatuses 20.

When the wireless-apparatus-information obtaining unit determines that the wireless apparatus information table 50 has been updated in step S13, the process proceeds to step S22. In step S22, the wireless-apparatus-information obtaining unit determines whether other ones of the wireless stations 10 in the radio communication system exists, to which the wireless apparatus information table 50 can be sent. For example, in a radio communication system in which, for each of the wireless stations 10, any other one of the wireless stations 10 to which the wireless apparatus information table 50 is sent is defined in advance, it is determined whether, for each of the wireless stations 10, any one of the wireless stations 10 to which the wireless apparatus information table 50 is sent is defined.

When the wireless-apparatus-information obtaining unit determines that other ones of the wireless stations 10 exist, to which the wireless apparatus information table 50 can be sent, the process proceeds to step S23. In step S23, the one of the wireless stations 10 sends data in the wireless apparatus information table 50 to the other ones of the wireless stations 10 via the wired network 30. On the other hand, when the wireless-apparatus-information obtaining unit determines in step S21 that the wireless apparatus information table 50 has not been updated or when the wireless-apparatus-information obtaining unit determines in step S22 that other ones of the wireless stations 10 do not exist, to which the wireless apparatus information table 50 can be sent, the wireless apparatus information table 50 is not sent.

In the aforementioned process, the one of the wireless stations 10 can send the wireless apparatus information table 50 owned by the one of the wireless stations 10 to the other ones of the wireless stations 10.

The one of the wireless stations 10 sends data in the wireless apparatus information table 50 to the other ones of the wireless stations 10 after attaching an identification number of the one of the wireless stations 10 to the data. The identification number is, for example, in the standards included in the IEEE 802.11, a Basic Service Set IDentifier (BSS-ID) that is a MAC address or an Extended Service Set IDentifier (ESS-ID) that is assigned by an administrator.

Returning to FIG. 4, the CPU 11 obtains the wireless apparatus information table 50 owned by each of the other ones of the wireless stations 10 from the wired network 30 via the wired LAN unit 15 and the control unit 12.

Then, in step S15, the creating means in the one of the wireless stations 10 creates the supplementary table 60. The supplementary table 60 is stored in the memory 13.

Figure 6:
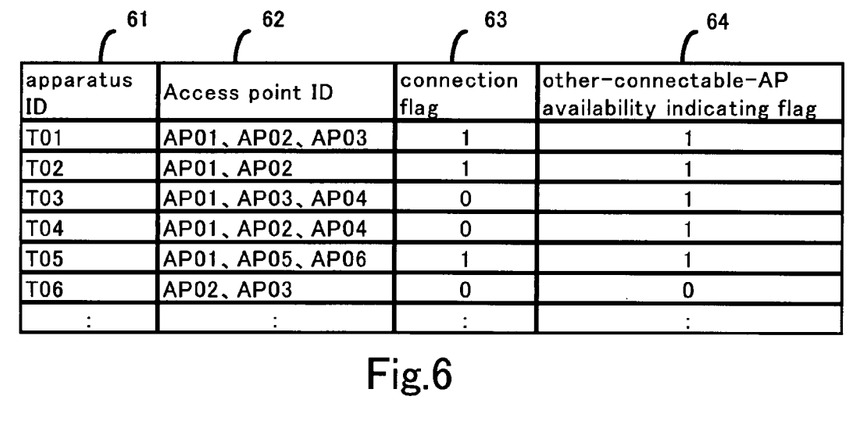
FIG. 6 shows an exemplary structure of a supplementary table.

FIG. 6 shows an exemplary structure of the supplementary table 60. The supplementary table 60 shows the relationships between ones of the wireless apparatuses 20 and ones of the wireless stations 10 that have received identification numbers of the ones of the wireless apparatuses 20. The supplementary table 60 is created from the wireless apparatus information table 50 of the one of the wireless stations 10 and the wireless apparatus information table 50 of each of the other ones of the wireless stations 10. In the supplementary table 60, ones of the wireless apparatuses 20 are first listed, and then ones of the wireless stations 10 that have received identification numbers of the ones of the wireless apparatuses 20 are listed. The supplementary table 60 is updated when the wireless apparatus information table 50 has been received from one of the other ones of the wireless stations 10. In the supplementary table 60, characters AP represent a wireless station, and a number suffixed to the characters AP represents an identification number for identifying each of the wireless stations 10. Moreover, in the supplementary table 60, a character T represents a wireless apparatus, and a number suffixed to the character T represents an identification number for identifying each of the wireless apparatuses 20. Items included in the supplementary table 60 are as follows:

A wireless apparatus ID 61 represents identification numbers of ones of the wireless apparatuses 20. For example, according to the standards included in the IEEE 802.11, an identification number is a MAC address.

An access point ID 62 represents identification numbers of ones of the wireless stations 10 that have received identification numbers of ones of the wireless apparatuses 20 represented by the wireless apparatus ID 61. The supplementary table 60 in FIG. 6 shows that, for example, an identification number of T01 of one of the wireless apparatuses 20 has been received by ones (01, 02, and 03) of the wireless stations 10 having identification numbers of AP01, AP02, and AP03.

A connection flag 63 represents whether ones of the wireless apparatuses 20 from which pieces of identification information are received are connecting to the one of the wireless stations 10. In the present embodiment, when each of the ones of the wireless apparatuses 20 is connecting to the one of the wireless stations 10, the connection flag 63 is set to one. Otherwise, the connection flag 63 is set to zero.

An other-connectable-access-point availability indicating flag 64 represents the result of a determining process described below. When each of the wireless apparatuses 20 listed in the wireless apparatus ID 61 can connect to one of the other ones of the wireless stations 10, the other-connectable-access-point availability indicating flag 64 is set to one. When each of the wireless apparatuses 20 listed in the wireless apparatus ID 61 cannot connect to any one of the other ones of the wireless stations 10, the other-connectable-access-point availability indicating flag 64 is set to zero.

The supplementary table 60 is created by the following steps: The CPU 11 first reads data in the probe-sending-wireless-apparatus identification information 53 included in the wireless apparatus information table 50 obtained from each of the other ones of the wireless stations 10. Then, the CPU 11 compares the probe-sending-wireless apparatus identification information 53 with the wireless apparatus ID 61 included in the supplementary table 60. When a value in the probe-sending-wireless-apparatus identification information 53 does not exist in the wireless apparatus ID 61, the value represents a new one of the wireless apparatuses 20. Thus, in the supplementary table 60, the value is added to the wireless apparatus ID 61, and the identification number of a corresponding one of the wireless stations 10 that has sent the wireless apparatus information table 50 is registered in the access point ID 62. When a value in the probe-sending-wireless-apparatus identification information 53 exists in an entry in the wireless apparatus ID 61, values in an entry in the access point ID 62 corresponding to the entry in the wireless apparatus ID 61 are checked. When the identification number of the corresponding one of the wireless stations 10 does not exist in the entry in the access point ID 62, the identification number of the corresponding one of the wireless stations 10 is registered in the entry in the access point ID 62. The supplementary table 60 can be updated by repeating the foregoing steps for all of the wireless apparatuses in the wireless apparatus information table 50.

The one of the wireless stations 10 updates the supplementary table 60 upon receiving the updated wireless apparatus information table 50 from the other ones of the wireless stations 10 via the wired network 30. In step S15, the timing of receipt of data of the wireless apparatus information table 50 from the other ones of the wireless stations 10 is irregular. This is because each of the other ones of the wireless stations 10 sends the wireless apparatus information table 50 owned by each of the other ones of the wireless stations 10 after updating the wireless apparatus information table 50. Thus, the process of supplementing data in step S15 is performed every time the one of the wireless stations 10 receives the wireless apparatus information table 50 from the other ones of the wireless stations 10.

A process of determining a connection will now be described. This process is performed by the one of the wireless stations 10 on the basis of the supplementary table 60 in step S16. The detecting unit in the one of the wireless stations 10 detects whether the number of ones of the wireless apparatuses 20 that are connecting to the one of the wireless stations 10 exceeds a predetermined number before the one of the wireless stations 10 newly starts to communicate with one of the wireless apparatuses 20 for data exchange. The determining process needs to performed before communication is started for data exchange. Thus, the determining process needs to performed before one of the wireless apparatuses 20 sends a connection request, i.e., after the supplementary table 60 is created, or during a period between the time when the one of the wireless stations 10 has received a connection request from one of the wireless apparatuses 20 and the time when the one of the wireless stations 10 sends the one of the wireless apparatuses 20 a response corresponding to the connection request.

Figure 8:
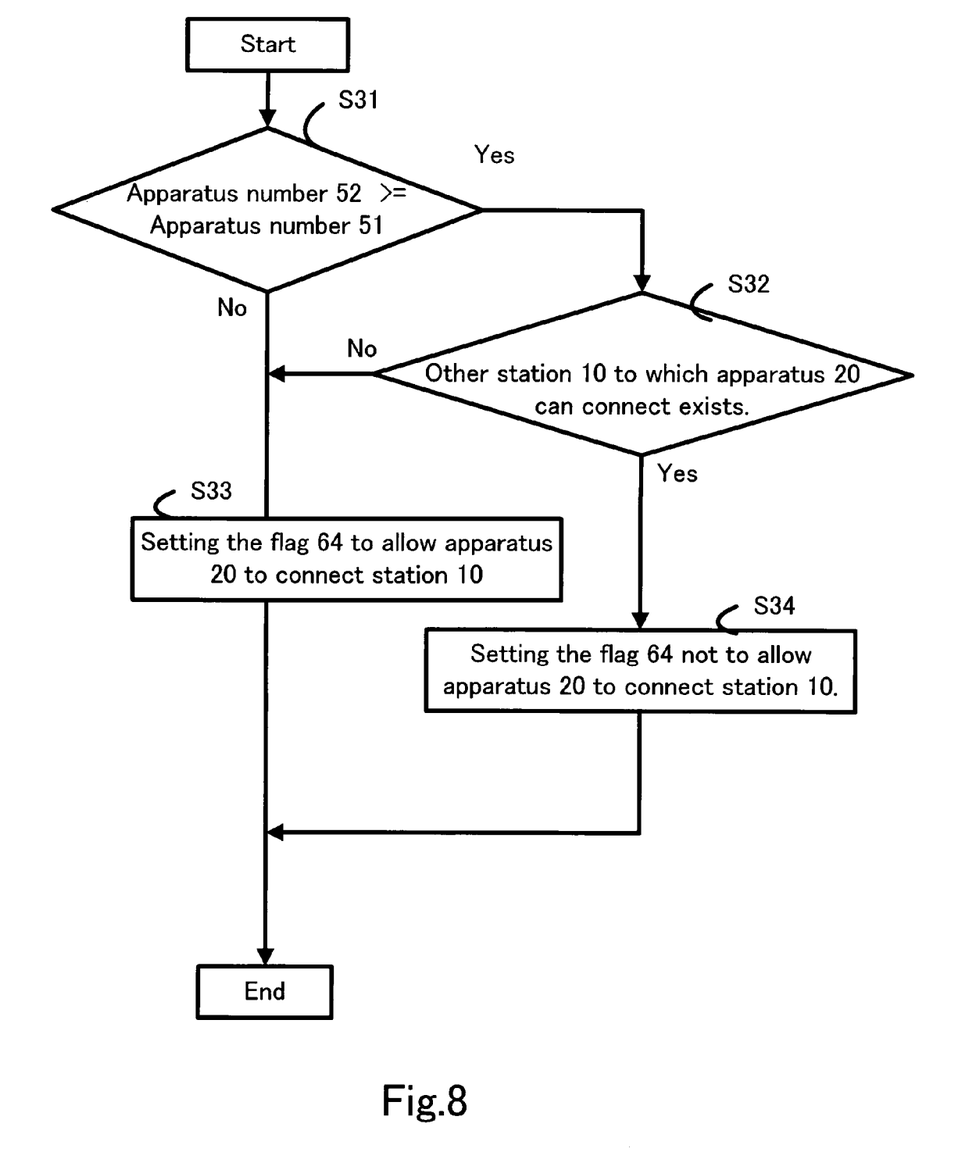
FIG. 8 is a flowchart showing a process of determining conditions for a connection.

FIG. 8 is a flowchart showing a process of determining conditions for a connection. This process may be performed for all ones of the wireless apparatuses 20 registered in the supplementary table 60 or only for specific ones of the wireless apparatuses 20 that have sent probe requests.

In step S31, the detecting unit in the one of the wireless stations 10 determines whether the currently-connecting-wireless-apparatus number 52 is equal to or more than the acceptable-connecting-wireless-apparatus number 51 in the wireless apparatus information table 50 owned by the one of the wireless stations 10 by comparing the acceptable-connecting-wireless-apparatus number 51 with the currently-connecting-wireless-apparatus number 52. In a case where the detecting unit determines that the currently-connecting-wireless apparatus number 52 is equal to or more than the acceptable-connecting-wireless-apparatus number 51, when the one of the wireless stations 10 allows a new connection, the one of the wireless stations 10 may be overloaded.

Thus, in this case, the process proceeds to step S32. In step S32, the extracting unit in the one of the wireless stations 10 extracts from the supplementary table 60 any ones of the other ones of the wireless stations 10 to which ones of the wireless apparatuses 20 can connect when the ones of the wireless apparatuses 20 send connection requests. Specifically, the extracting unit refers to a record in the supplementary table 60 that has a value of the wireless apparatus ID 61 equal to the identification number of each of the ones of the wireless apparatuses 20, extracts values in the access point ID 62 in the record, and determines whether any one of the other ones of the wireless stations 10 exists, to which each of the ones of the wireless apparatuses 20 can connect.

When the extracting unit determines in step S32 that at least one of the other ones of the wireless stations 10 exists, to which each of the ones of the wireless apparatuses 20 can connect, in step S34, the one of the wireless stations 10 determines to send no response to each of the ones of the wireless apparatuses 20, and the determining unit stores the result of the determination in the other-connectable-access-point availability indicating flag 64 in the record in the supplementary table 60. In FIG. 6, when each of the wireless apparatuses 20 can connect to at least one of the other ones of the wireless stations 10, the other-connectable-access-point availability indicating flag 64 is set to one, and when each of the wireless apparatuses 20 cannot connect to any one of the other ones of the wireless stations 10, the other-connectable-access-point availability indicating flag 64 is set to zero.

On the other hand, in a case where the detecting unit determines in step S31 that the currently-connecting-wireless apparatus number 52 is less than the acceptable-connecting-wireless-apparatus number 51 or in a case where the extracting unit determines in step S32 that none of the other ones of the wireless stations 10 exists, to which each of the ones of the wireless apparatuses 20 can connect, in step S33, the determining unit determines to allow each of the ones of the wireless apparatuses 20 to connect to the one of the wireless stations 10, and stores the result of the determination in the other-connectable-access-point availability indicating flag 64 in the record in the supplementary table 60. In the case where the detecting unit determines in step S31 that the currently-connecting-wireless apparatus number 52 is less than the acceptable-connecting-wireless-apparatus number 51, even when each of the ones of the wireless apparatuses 20 connects to the one of the wireless stations 10, the one of the wireless stations 10 is not overloaded.

Returning to FIG. 4, a case will now be described, where one of the wireless apparatuses 20 sends a connection request to the one of the wireless stations 10 to belong to the one of the wireless stations 10 in step S17. It depends on the specification of one of the wireless apparatuses 20 which of the wireless stations 10 the one of the wireless apparatuses 20 sends a connection request. For example, one of the wireless apparatuses 20 may send a connection request to one of the wireless stations 10 from which a beacon has been received just before sending the connection request, or may store ones of the wireless stations 10 from which beacons have been received and select one of the ones of the wireless stations 10 depending on the radio field intensity. In the present embodiment, one of the wireless apparatuses 20 sends a connection request signal to the surrounding area.

When the one of the wireless stations 10 has received a connection request from the one of the wireless apparatuses 20, in, step S18, the one of the wireless stations 10 performs a process corresponding to the connection request with reference to the other-connectable-access-point availability indicating flag 64 in the supplementary table 60 created in step S15. When the one of the wireless stations 10 determines to send no response corresponding to the connection request from the one of the wireless apparatuses 20, according to a known standard, the one of the wireless apparatuses 20 sends a connection request to one of the other ones of the wireless stations 10.

In the present embodiment, it is determined on the basis of the predetermined maximum number of ones of the wireless apparatuses 20 that can connect to the one of the wireless stations 10 whether one of the wireless apparatuses 20 can connect to the one of the wireless stations 10. Alternatively, the determination may be made on the basis of the CPU load in the one of the wireless stations 10. For example, an arrangement may be adopted, in which a threshold value of the CPU load is preset, and data of the current CPU load in the one of the wireless stations 10 can be obtained. In this arrangement, when the current CPU load exceeds the threshold value, the one of the wireless stations 10 does not accept any additional connection.

In standards such the IEEE 802.11, a protocol between wireless apparatuses and wireless stations is defined, and processes between wireless apparatuses and wireless stations need to be performed according to the protocol. However, the present embodiment can be applied to known radio communication systems merely by adopting the wireless stations 10 according to the present embodiment.

Before one of the wireless apparatuses 20 connects to the one of the wireless stations 10, the one of the wireless stations 10 can determine by performing the foregoing process whether the one of the wireless stations 10 accepts connection from one of the wireless apparatuses 20. As the result, it is not required to determine the load of the one of the wireless stations 10 on the basis of the result of connecting one of the wireless apparatuses 20 to the one of the wireless stations 10. Thus, when it is determined whether one of the wireless apparatuses 20 can connect to the one of the wireless stations 10, the time required to determine the current load of the one of the wireless stations 10 can be reduced.

For example, the determining unit may perform the following process: The determining unit obtains the predetermined number of ones of the wireless apparatuses 20 that can connect to the other ones of the wireless stations 10 and the number of ones of the wireless apparatuses 20 that are currently connecting to the other ones of the wireless stations 10. The data of these number is stored in the supplementary table 60. Then, after the determination in step S32, when the number of ones of the wireless apparatuses 20 that are currently connecting to the other ones of the wireless stations 10 exceeds the predetermined number of ones of the wireless apparatuses 20 that can connect to the other ones of the wireless stations 10, the one of the wireless stations 10 accepts connection from one of the wireless apparatuses 20. Otherwise, the one of the wireless stations 10 does not accept connection from one of the wireless apparatuses 20.

What is claimed is:

1. A wireless station connectable with other wireless stations and a plurality of wireless apparatuses for controlling communication with the wireless station, the wireless station comprising:
    a detecting module for detecting information from the other wireless stations, the information indicating the wireless apparatuses connectable to the other wireless stations, wherein a wireless apparatus is connectable to a wireless station when the wireless station has received an identification number from the wireless apparatus, but is not connected to the wireless station;
    an updating module for updating a table stored in the wireless station indicating the wireless apparatuses that are connected to and that are connectable to the other wireless stations on the basis of the detected information;
    a receiving module for receiving a connection request from one of the wireless apparatuses;
    a determining module for determining to send no response corresponding to the connection request when a number of the wireless apparatuses connected to the wireless station exceeds a predetermined number and the one of the wireless apparatuses is connectable to the other wireless stations on the basis of the table; and
    a sending module for sending no response to the one of the wireless apparatuses on the basis of the determination of the determining module.

2. The wireless station according to claim 1, wherein the determining module determines to send a response to the one of the wireless apparatuses which is ready to access to the wireless station and is unready to access to the other wireless station when the number of the wireless apparatuses connected to the wireless station exceeds a predetermined number.

3. The wireless station according to claim 2, wherein said predetermined number is determined that a predetermined speed of communication between each of the wireless stations and ones of the wireless apparatuses can be maintained.

4. The wireless station according to claim 1, wherein the connection request sent from one of the second wireless apparatuses is a probe request.

5. A method for controlling a wireless station connectable with other wireless stations and a plurality of wireless apparatuses for controlling communication with the wireless station, comprising:
    detecting information from the other wireless stations, the information indicating the wireless apparatuses connectable to the other wireless stations, wherein a wireless apparatus is connectable to a wireless station when the wireless station has received an identification number from the wireless apparatus, but is not connected to the wireless station;
    updating a table stored in the wireless station indicating the wireless apparatuses that are connected to and that are connectable to the other wireless stations on the basis of the detected information;
    receiving a connection request from one of the wireless apparatuses;
    determining to send no response corresponding to the connection request when a number of the wireless apparatuses connected to the wireless station exceeds a predetermined number and the one of the wireless apparatuses is connectable to the other wireless stations on the basis of the table; and
    sending no response to the one of the wireless apparatuses on the basis of the determination of the determining module.

6. The method for according to claim 5, wherein the determining comprises determining to send a response to the one of the wireless apparatuses which is ready to access to the wireless station and is unready to access to the other wireless station when the number of the wireless apparatuses connected to the wireless station exceeds a predetermined number.

7. A computer program product having a non-transitory computer readable medium having computer program recorded thereon for controlling a wireless station connectable with other wireless stations and a plurality of wireless apparatuses for controlling communication with the wireless apparatus, said computer program comprising computer program instructions for:
  detecting information from the other wireless stations, the information indicating the wireless apparatuses connectable to the other wireless stations, wherein a wireless apparatus is connectable to a wireless station when the wireless station has received an identification number from the wireless apparatus, but is not connected to the wireless station;
  updating a table stored in the wireless station indicating the wireless apparatuses that are connected to and that are connectable to the other wireless stations on the basis of the detected information;
  receiving a connection request from one of the wireless apparatuses;
  determining to send no response corresponding to the connection request when a number of the wireless apparatuses connected to the wireless station exceeds a predetermined number and the one of the wireless apparatuses is connectable to the other wireless stations on the basis of the table; and
  sending no response to the one of the wireless apparatuses on the basis of the determination of the determining module.

8. The computer program product according to claim 7, wherein the determining comprises determining to send a response to the one of the wireless apparatuses which is ready to access to the wireless station and is unready to access to the other wireless station when the number of the wireless apparatuses connected to the wireless station exceeds a predetermined number.

9. The computer program product according to claim 8, wherein said predetermined number is determined that a predetermined speed of communication between each of the wireless stations and ones of the wireless apparatuses can be maintained.

10. The computer program product according to claim 7, wherein the connection request sent from one of the second wireless apparatuses is a probe request.

11. A wireless communication system having a plurality of wireless stations connectable with other wireless stations and a plurality of wireless apparatuses for controlling communication the wireless stations, comprising:
  said wireless apparatus sending a connection request; and
  said wireless station,
  detecting information from the other wireless stations, the information indicating the wireless apparatuses connectable to the other wireless stations, wherein a wireless apparatus is connectable to a wireless station when the wireless station has received an identification number from the wireless apparatus, but is not connected to the wireless station;
  updating a table stored in the wireless station indicating the wireless apparatuses that are connected to and that are connectable to the other wireless stations on the basis of the detected information;
  receiving a connection request from one of the wireless apparatuses;
  determining to send no response corresponding to the connection request when a number of the wireless apparatuses connected to the wireless station exceeds a predetermined number and the one of the wireless apparatuses is connectable to the other wireless stations on the basis of the table; and
  sending no response to the one of the wireless apparatuses on the basis of the determination of the determining module.

12. The wireless communication system according to claim 11, wherein the determining comprises determining to send a response to the one of the wireless apparatuses which is ready to access to the wireless station and is unready to access to the other wireless station when the number of the wireless apparatuses connected to the wireless station exceeds a predetermined number.

13. The wireless communication system according to claim 12, wherein said predetermined number is determined that a predetermined speed of communication between each of the wireless stations and ones of the wireless apparatuses can be maintained.

14. The wireless station according to claim 11, wherein the connection request sent from one of the second wireless apparatuses is a probe request.

* * * * *